Sept. 29, 1936.  E. P. BURRELL  2,055,651
MACHINE TOOL
Original Filed May 12, 1932  4 Sheets-Sheet 1

INVENTOR.
EDWARD P. BURRELL
BY
Kwis Hudson & Kent
ATTORNEYS

Sept. 29, 1936.  E. P. BURRELL  2,055,651
MACHINE TOOL
Original Filed May 12, 1932   4 Sheets-Sheet 2

INVENTOR.
EDWARD P. BURRELL
BY
Kwis Hudson & Kent
ATTORNEYS

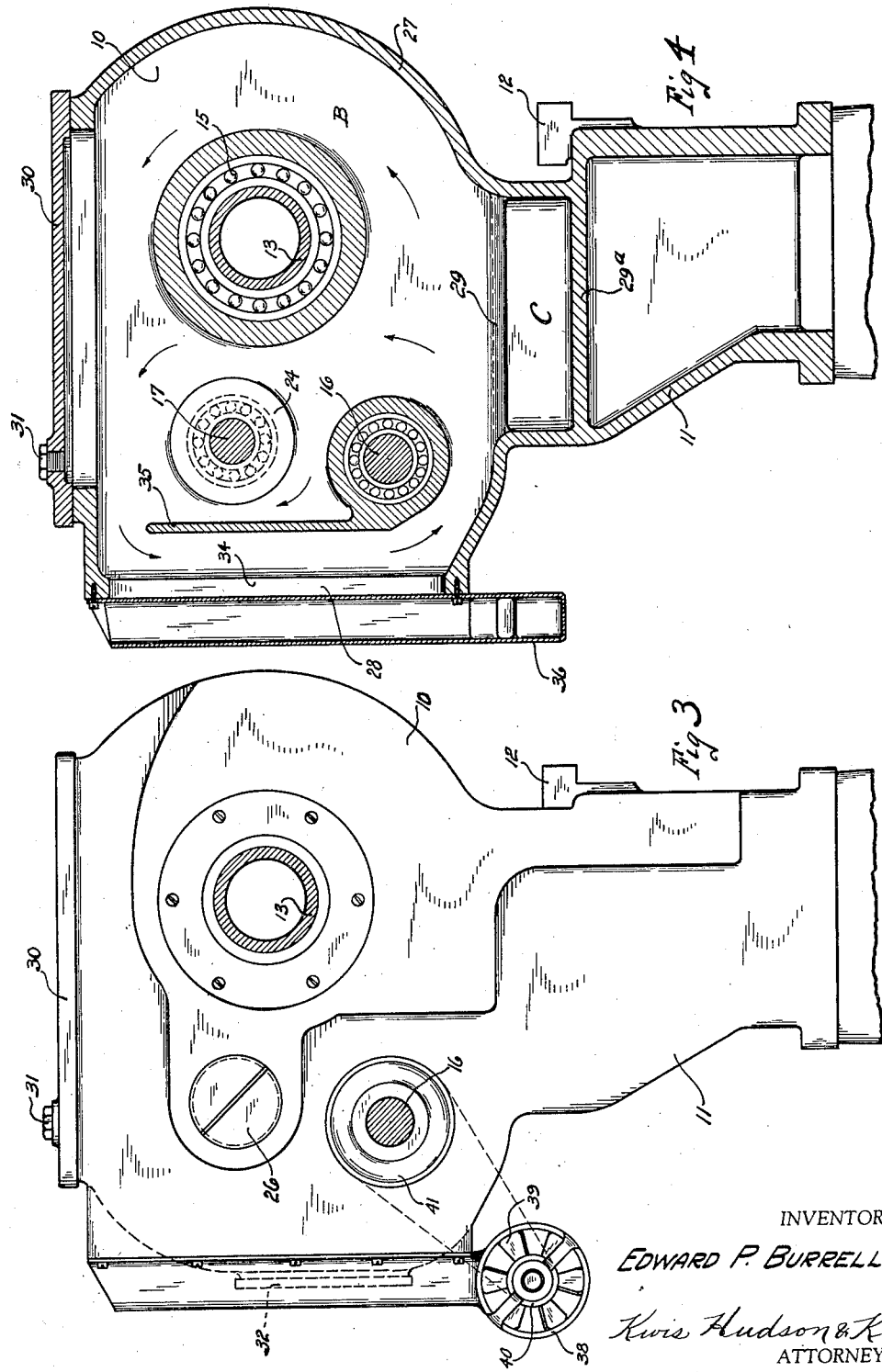

Sept. 29, 1936.   E. P. BURRELL   2,055,651
MACHINE TOOL
Original Filed May 12, 1932   4 Sheets-Sheet 4
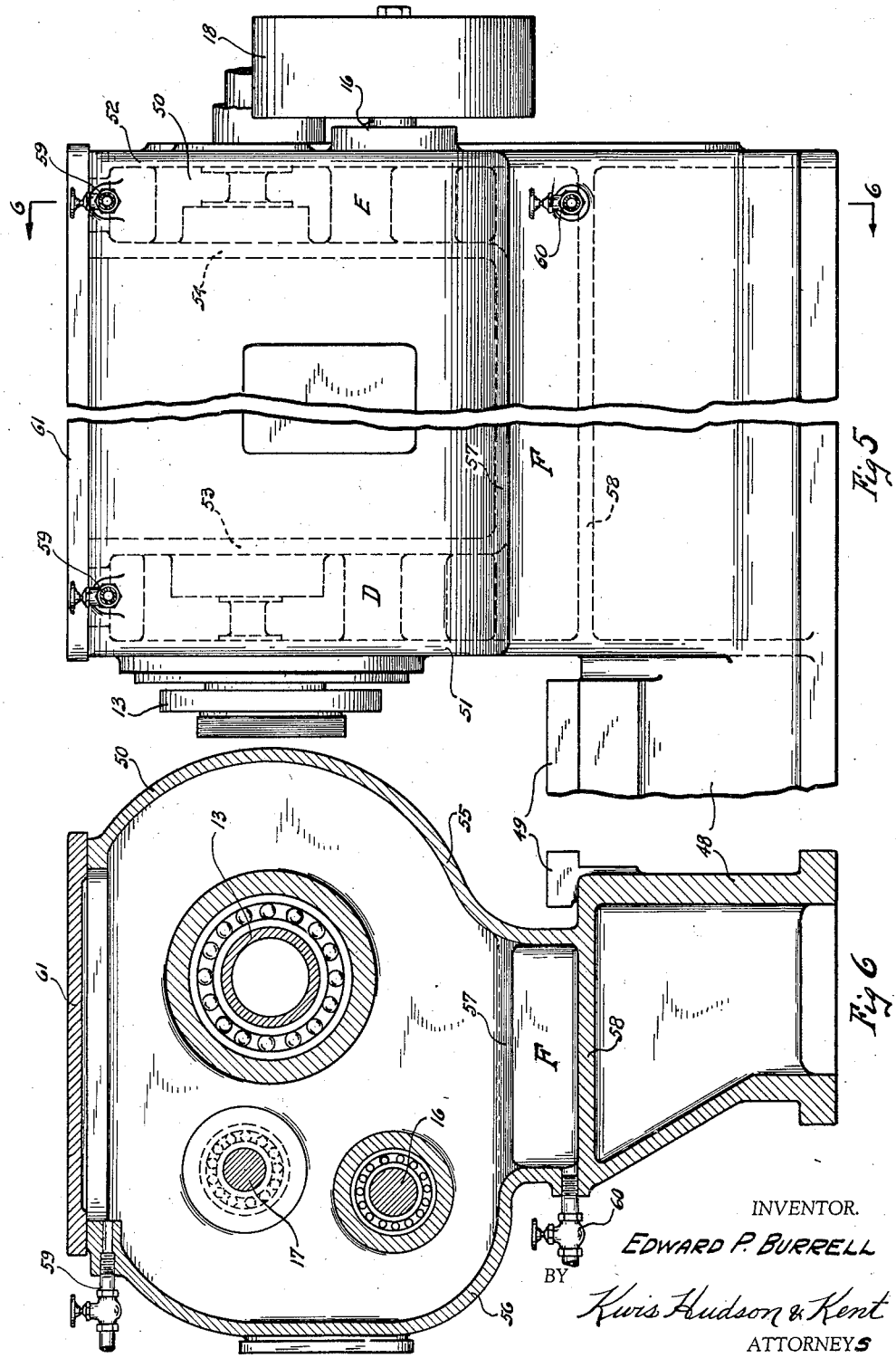
INVENTOR.
EDWARD P. BURRELL
BY
Kwis Hudson & Kent
ATTORNEYS Patented Sept. 29, 1936

2,055,651

UNITED STATES PATENT OFFICE 2,055,651

MACHINE TOOL

Edward P. Burrell, Shaker Heights, Ohio, assignor to The Warner & Swasey Company, Cleveland, Ohio, a corporation of Ohio Original application May 12, 1932, Serial No. 610,904. Divided and this application June 21, 1935, Serial No. 27,740

24 Claims. (Cl. 82—32)

This invention relates to a machine tool and particularly to a system for controlling the temperature of those moving parts of a machine tool which are subject to temperature changes during the operation of the machine.

This application is a division of copending application Serial No. 610,904, filed May 12, 1932.

Heretofore the quality of the cutting tools used in machine tools has precluded the use of high operating speeds for the machine since the tools would break down when brought into cutting engagement with the work. The slow operating speeds under the old practice did not produce in the various operative parts of the machine sufficient heat to be detrimental to the machine or to said parts. Under present day operating practice for machine tools, the quality of the cutting tools is such that high operating speeds are usually imparted to certain of the movable parts of the machine, resulting in a substantially greater degree of heat being developed in the bearings, spindles, shafts, and other moving parts, as well as in the lubricant for lubricating said parts, thus rendering it necessary that efficient means be provided for cooling the lubricant and such parts of the machine. The heat developed in such parts of the machine and in the lubricant results in wear and is liable to produce distortion of the parts and misalignment therein due to the greater expansion of certain parts of the machine than of other parts thereof.

An object of the invention is to provide in a machine tool efficient and effective means for controlling the temperature of certain moving parts of the machine and the supports therefor, as well as the lubricant for said parts, which are subject to temperature changes during the operation of the machine.

Another object is to provide means in a machine tool for maintaining the correct relationship between various moving parts of the machine and the supports therefor that are subject to temperature changes during the operation of the machine, to the end that the efficiency, accuracy and the alignment of said parts and of the machine will be retained.

Another object is to provide in a machine tool passageways through which fluid is circulated and which passageways are arranged adjacent certain parts of the machine which are subject to temperature changes during operation and adjacent the reservoir which holds the lubricant for such parts, whereby the circulating fluid will control the temperature of said parts and the lubricant.

Another object of the invention is to provide in a machine tool having certain parts which are subject to temperature changes during operation means for circulating fluid in thermal transferring relationship to said parts and to the lubricant therefor, and in such volume, velocity and at such temperature as to maintain such parts and lubricant substantially at a desired temperature.

Another object is to provide in a machine tool having certain parts that are subject to temperature changes during operation means for circulating liquid in thermal transferring relationship to said parts and to the lubricant therefor, and in such volume, velocity and at such temperature as to maintain said parts and lubricant substantially at a desired temperature.

Another object of the invention is to provide in a machine tool having certain parts that are subject to temperature changes during operation, means for circulating liquid in thermal transferring relationship to said parts and to the lubricant therefor, and means for circulating fluid in thermal transferring relationship to said liquid to control the temperature of the latter and in turn the temperature of said parts and of the lubricant therefor.

Additional and further objects will appear hereinafter during the following detailed description of several embodiments of the invention illustrated in the accompanying drawings, wherein:

Fig. 1 is a fragmentary rear elevation view with certain parts shown in section, of a machine tool embodying one form of the invention, certain parts of the machine being omitted.

Fig. 1ª is a detached detail view, partly in section, of a modified form of construction from that disclosed in Fig. 1.

Fig. 3 is an end elevational view of the machine shown in Fig. 1 and is taken from the right hand side of said figure, certain parts of the machine being omitted and other parts being shown in section.

Fig. 4 is a transverse vertical section taken substantially on line 4—4 of Fig. 2, looking in the direction of the arrows.

Fig. 5 shows another form of the invention from those previously illustrated and is a fragmentary rear elevational view of a machine tool, certain parts of the machine being omitted, and Fig. 6 is a transverse vertical sectional view through the machine shown in Fig. 5 and is taken substantially on line 6—6 of Fig. 5 looking in the direction of the arrows.

Figure 1:
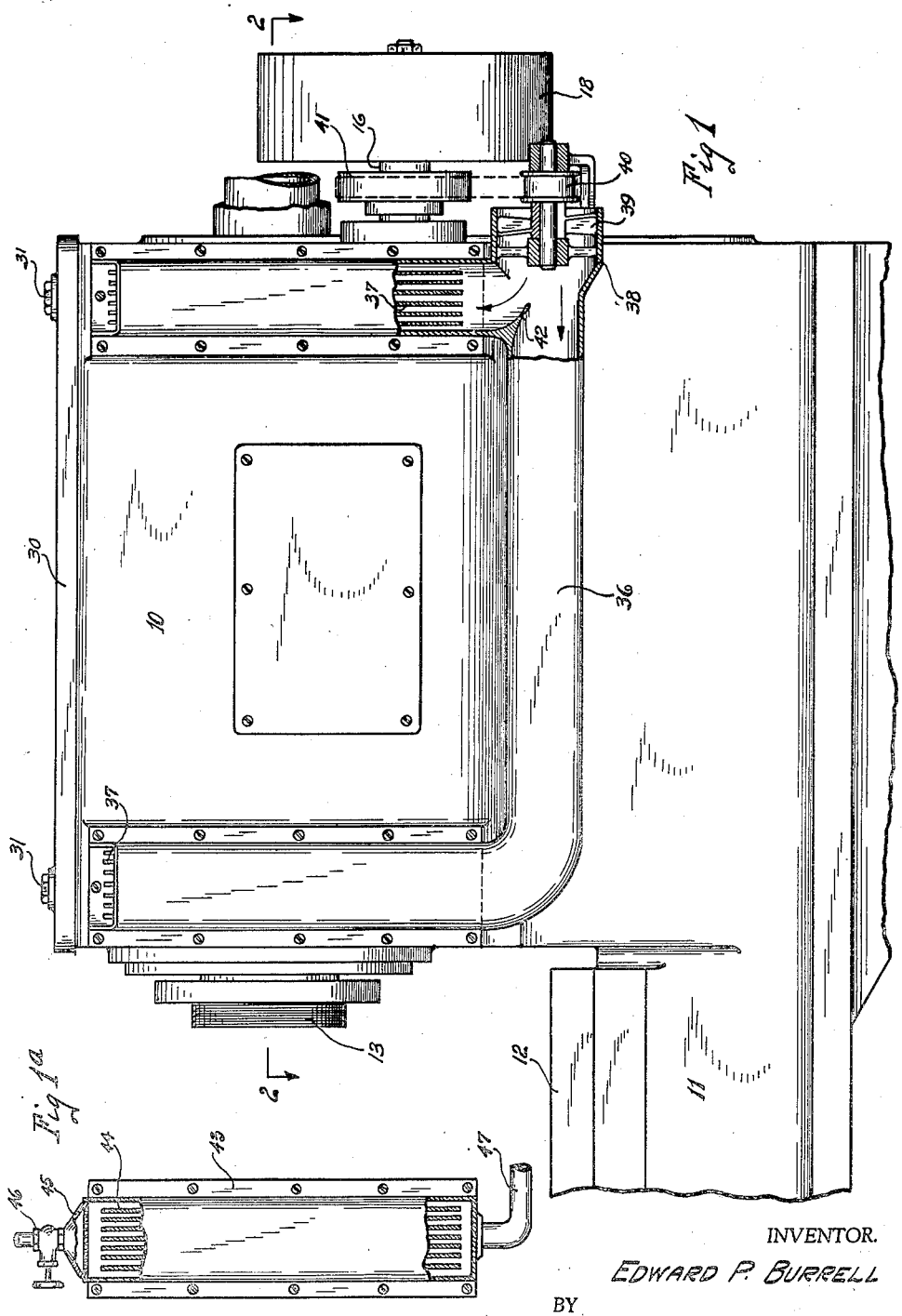
Figure 2:
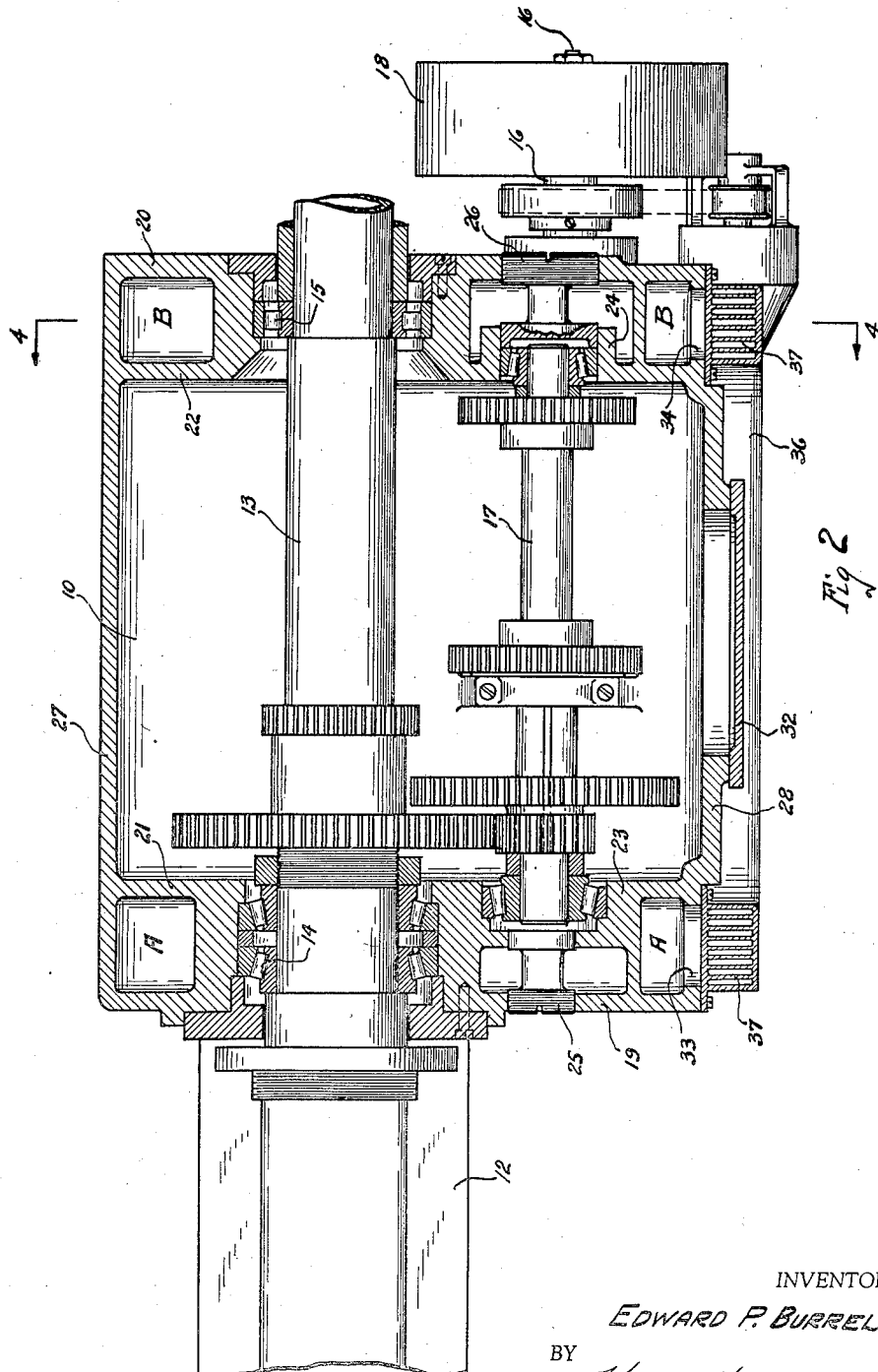
Fig. 2 is a horizontal irregular sectional view taken substantially on line 2—2 of Fig. 1, looking in the direction of the arrows.

Although the invention contemplates broadly the provision of means in a machine tool for controlling the temperatures of various parts of the machine which are subject to temperature changes in operation, the embodiment of the invention illustrated in the accompanying drawings and described herein will relate, by way of illustration, to the provision of means in the head of the machine for controlling the temperatures of the bearings, spindles, shafts and lubricant, but it should be understood that the invention is applicable also for controlling the temperature of other parts of the machine which may contain bearings, shaftings, moving parts and/or lubricant.

The employment of high grade cutting tools as practiced at the present time in machine tools has necessitated increased work spindle speeds which result in greatly increasing the degree of heat developed by the various operating parts of the machine. In addition, the use of the higher grade cutting tools allows cuts of greater depth and thickness to be taken in the work, resulting in greater thrust between the tools and work, and creating an increased end thrust relation between the spindle and its bearings with a consequent increase in the heat developed in the bearings. The continuous operation of machine tools under the above mentioned conditions and for long periods of time might bring about distortion in the different parts of the machine because of the amount of heat developed therein, with a consequent misalignment of said parts, and unless this heat is kept at a predetermined temperature, as, for example, substantially room temperature, the accuracy and efficiency of the machine will be destroyed due to the changed relationship between the parts.

The present invention contemplates the provision of means in a machine tool which will maintain the various operative parts of the machine at the desired temperature, thereby eliminating distortion and retaining the correct alignment between the parts and hence the accuracy and efficiency of the machine, and reducing to a minimum the wear occasioned in such parts during their operation.

Referring to Figs. 1, 2, 3, and 4, wherein a machine embodying one form of the invention is disclosed, there is shown a machine tool having a substantially hollow head 10, a bed 11, ways 12 and a work spindle 13 rotatably supported in bearings 14 and 15 carried by the head and controlled by suitable clutches (not shown) and driven by a main drive shaft 16 through suitable gearing arranged on a countershaft 17 also rotatably mounted in the head, while the shaft 16 is driven from any suitable source of power, such as a driving pulley 18. The head 10 has end walls 19 and 20 and intermediate transverse walls 21 and 22 spaced from the end walls respectively. The supports for the bearings 14 and 15 of the spindle 13 are integrally formed with the walls 19 and 21 and the walls 20 and 22, see Fig. 2. The supports for the bearings for the main drive shaft 16 are similarly formed while the supports for the bearings for the countershaft 17 comprise bosses 23 and 24 integral with the walls 21 and 22, there being a third bearing for the countershaft 17 located between the other two bearings. The recesses in the boss 23 in which the bearing for the countershaft is arranged is sealed by a plug 25 while the bearing recess in the boss 24 is sealed by a plug 26 which plugs can be removed to permit the bearings to be adjusted. The chamber formed by the walls 21 and 22, the front wall 27 of the head, and the rear wall 28 thereof, together with a bottom wall 29, form a lubricant chamber substantially housing the work spindle 13, the countershaft 17, the drive shaft 16 and the gearing and clutches, the lower portion of said chamber constituting a lubricant reservoir. Lubricant may be circulated in the chamber by means of a suitable pump (not shown) from the lubricant reservoir through the bearings and over the spindle, shafts and gearing, from which it flows along the walls into the reservoir portion of the chamber, or the lubricant may be circulated by some other suitable means, such as a splash system.

The outer walls of the head and the intermediate transverse walls 21 and 22 thereof form continuous passageways A and B which surround the bearings for the spindle and the shafts, and these passageways are connected at the lower portion of the head by a passageway C extending longitudinally of the head and formed by the front wall 27, rear wall 28, bottom wall 29 and a wall 29a spaced below the bottom wall 29 and arranged parallel thereto. The head 10 is provided with a cover plate 30 which closes the upper ends of the passageways A and B and also the lubricant chamber in the head. The cover plate 30 is provided with openings communicating with the passageways A and B, respectively, such openings being normally closed by means of threaded plugs 31 which enable the passageways A, B and C to be filled with a suitable liquid. The rear wall 28 of the head is provided with a cover plate 32 to give access to the gearing and the lubricant chamber and is provided at its opposite ends with vertically extending openings 33 and 34 communicating, respectively, with the passageways A and B. Within the passageways A and B and adjacent the openings 33 and 34 but spaced inwardly therefrom there are provided vertically extending baffle ribs or plates 35 separating the passageways A and B at the rear of the head into two portions for a purpose later to be explained.

A substantially U-shaped tubular member 36 is located at the rear of the head and has its vertically extending legs secured to the rear wall 28 by screws or other suitable securing means and in overlying relation with respect to the openings 33 and 34 and acting to seal said openings. The upper ends of the legs of the member 36 are open and the vertically extending portions of the legs are provided with a series of spaced radiating fins or vanes 37. The member 36 is preferably formed of light material having good thermo-conductive characteristics and is provided at its lower portion and adjacent the drive pulley 18 with a funnel-shaped enlargement 38 having a bore and supporting therein a shaft upon which is arranged a fan 39 and a pulley 40. The pulley 40 is driven by means of a belt from a pulley 41 arranged on the main drive shaft, and it will be seen that, when the fan 39 is rotating, fluid will be forced into or withdrawn from the member 36, depending upon the direction of rotation of the fan and causing a flow of fluid through the member 36.

In order to direct the flow of fluid through the member 36 and into both legs thereof, a deflector rib 42 is provided within the member at the lower end of the leg adjacent the fan. The passageways A, B and C having been filled with liquid and the machine being in operation, it will be seen that a circulation of fluid through both legs of the member 36 takes place and that such fluid passes over the radiating fins or vanes 37. The liquid in the passageways A, B and C being in contact with the walls of the lubricant chamber and with the bearing supports for the spindle and shafts, controls the temperature of said walls and said bearing supports. However, the temperature of the liquid in the passageways immediately adjacent the openings 33 and 34 and between the same and the baffle ribs or plates 35 is controlled because of its contact with the inner wall of the legs of the member 36 through which fluid is being circulated by the fan 39. The liquid being cooled by its contact with the member 36, a temperature differential will be created in different portions of the liquid and a continuous circulation thereof in the passageways will take place, such circulation being either in the direction of the arrows in Fig. 4 or in the opposite direction, depending upon whether the temperature of the liquid which contacts with the member 36 is raised or lowered with respect to the remainder of the liquid. It will be understood that sometimes it is desirable to circulate heated fluid through the member 36, and in such an instance the liquid in the passageways contacting with the member 36 would have its temperature increased and the circulation in the passageways would be in the reverse direction from that shown in Fig. 4. The passageways A and B being connected by the lower passageway C, it will be seen that any difference in temperature in the liquid in one passageway over the temperature of the liquid in the other passageway will be neutralized and the temperature of the liquid in both passageways will be maintained substantially equal, resulting in maintaining an equal temperature in all of the bearings in the head of the machine.

Since the liquid is in contact with the walls of the lubricant chamber and the supports for the bearings, it will be readily appreciated that the temperature of said walls and supports will be controlled by the liquid and that the lubricant which is circulated into the bearings and over the gearing and shafting returns to the lubricant reservoir over the walls of the lubricant chamber and its temperature is thus controlled prior to reaching the reservoir. The temperature of the lubricant in the reservoir is further controlled by the liquid in the passageway C which is in contact with the bottom wall of the lubricant chamber.

Referring to Fig. 1ª, there is disclosed a modified form of the member 36 which can be used in place of the member 36 in a machine embodying the construction just described. In Fig. 1ª the member 43 is provided with vanes or fins 44 similar to the vanes or fins 37 of the member 36. The members 43 are secured to the rear wall 30 over each of the openings 33 and 34 to close the same in a manner similar to the function of the legs of the member 36. However, in place of circulating a fluid over the fins or vanes by means of a fan, liquid is circulated through the member 43 and over the fins or vanes. The upper ends of the members 43 are connected by funnels 45 carried by a valved conduit 46 and having a plate provided with a multiplicity of small perforations, while the lower ends of the members 43 are closed except for an opening communicating with an exhaust conduit 47. The liquid enters the members 43 through the funnels 45 when the valved conduits 46 are open, and leaves the members through the conduits 47, and such liquid in its passage through the members passes over the vanes in a multiplicity of small streams because of the perforated plate and controls the temperature of the vanes. It will be understood that the members 43 are located at each end of the head in positions corresponding to the positions occupied by the leg portions of the member 36. It will be further understood that the liquid in the passages A, B and C in contact with the members 43 through the openings 33 and 34 will have its temperature controlled by its contact with the members and hence a circulation of the liquid in the passageways will be brought about, as described in the form of the invention shown in Figs. 1 to 4 inclusive.

Another embodiment of the invention is illustrated in Figs. 5 and 6, wherein the passageways in the head are filled with a positively circulated liquid. The machine tool shown in this form comprises a bed 48, ways 49 and a head 50, as is well understood, while the work spindle, shafts and gearings correspond to those parts illustrated in Figs. 1 to 4 inclusive and are designated by the same reference characters. It will be seen that between the end walls 51 and 52 of the head and the intermediate walls 53 and 54 passageways D and E are provided which extend around the bearings for the spindle and shafts and are connected at their lower ends with a passageway F extending between the front wall 55, rear wall 56, bottom wall 57 of the lubricant chamber and a wall 58 spaced below the bottom wall 57. The construction of the bearings for the spindle and shafts and the change speed gearing and clutches arranged thereon is exactly the same as in the form illustrated in Figs. 1 to 4 inclusive. Valved conduits 59 communicate with the upper end of the passageways D and E, while another valved conduit 60 communicates with the passageway F.

It will be understood that the conduits 59 and 60 may be connected with any suitable source of circulated liquid, such as the usual water supply pipes or to the positively circulated coolant which is used in machines of this character for cooling the work and tools and which is ordinarily circulated by means of a pump from the coolant reservoir over the tools and work. By properly regulating the valves of the conduits 59 and 60, the passageways D, E, and F may be filled with liquid and a constant circulation of said liquid through the passageways can be maintained, it being understood that the liquid may be introduced into the passageways either through the conduits 59 and removed therefrom through the conduit 60, or it may be introduced in the reverse direction through the conduit 60 and removed or exhausted through the conduits 59. As is well understood in the art, some well known form of thermostatically and automatically operated valve could be employed in place of the valves associated with the conduits 59 and 60 to control and regulate the circulation of the liquid through the passageways, but as the use of thermostatically and automatically operated valves to control and regulate the circulation of liquid is so well known in the art the same has not been illustrated herein.

A cover plate 61 covers the upper ends of the passageways D and E and the lubricant chamber. When the machine is in operation lubricant is distributed by means of a pump or by a splash system into the bearings for the spindle and shafts and over the gearing thereon, such lubricant returning to the reservoir portion of the lubricant chamber along the walls of the chamber. However, since the continually circulated liquid in the passages D, E, and F is in contact with the walls 53, 54 and 57 of the lubricant chamber, it will be seen that the temperature of said walls is controlled by the liquid and that when the lubricant is carried from the reservoir portion and is again distributed around the bearings and over the gearing the temperature of the lubricant will be of the desired degree and the lubricant will have a more efficient temperature controlling effect upon the parts over which it flows. Also, the liquid in the passages D and E completely surrounds and is in contact with the supports for the bearings and shafts and will thus act to control the temperature of said bearings.

It will be understood that in some instances it will be desirable to have the circulated liquid act to control the temperature of the lubricant and bearings by raising the temperature thereof rather than by cooling the same, and in such cases it will be understood that the liquid circulated through the passages D, E, and F will be heated liquid or will be liquid having a temperature other than room temperature.

It will be seen that in the forms of the invention described herein means is provided for controlling the temperature of the bearing supports for the spindle and shafts, for controlling the temperature of the lubricant for said bearings, spindle and shafts, and for controlling the temperature of the shafts, gearings and clutches thereon. The provision of the temperature controlling means disclosed herein enables the machine to be operated at extremely high speeds and continuously for long periods of time, since the temperatures of all of the parts which are subject to temperature changes during operation are adequately controlled and, in fact, can be maintained substantially at the desired temperatures for the most efficient operation under varying working conditions. Furthermore, due to the employment of the controlling means referred to, the temperatures of the various parts of the machines are maintained substantially equal and, therefore, distortion which would otherwise develop in these parts is substantially eliminated, with the result that there is no misalignment of the parts due to unequal distortion, and thus the accuracy and efficiency of the machine is increased.

In the use of the improved cutting tools of the present time it is possible to maintain greater operating speeds, and employ increased cutting pressures, resulting in greater thrust between the tool and the work and between the work spindle and its bearings, both of which bring about a tendency for greater temperature changes to occur in the operative parts of the machine and the lubricant therefor. However, due to the arrangement disclosed herein, such parts of the machine are maintained at substantially the desired temperature.

Although several preferred embodiments of the invention have been illustrated and described herein, it should be understood that the invention is susceptible of various other modifications and adaptations within the scope of the appended claims, and that means similar to those herein described may be employed in connection with the controlling of the temperature of other parts of the machine wherein there are bearings, shafting and gearing, such as aprons, gear boxes and other similar parts which may be subject to temperature changes in the operation and that the illustration of the temperature controlling means in the head stock of a lathe is purely by way of example.

Having thus described my invention I claim:

1. In a machine tool, a lubricant chamber, a passageway substantially surrounding said chamber, and means for circulating liquid through said passageway to control the temperature of the lubricant in said chamber and to eliminate distortion in the various parts of the machine.

2. In a machine tool having a movable part, bearings for said part, a passageway surrounding said bearings, and means for circulating liquid through said passageway to control the temperature of said bearings and to eliminate distortion therebetween.

3. In a machine tool, a lubricant chamber, a passageway substantially surrounding said chamber, means for circulating liquid through said passageway, and means for circulating fluid in heat exchanging relationship with said liquid.

4. In a machine tool having a movable part, bearings for said part, a passageway surrounding said bearings, means for circulating liquid through said passageway, and means adjacent said passageway for circulating fluid in heat exchanging relationship with the liquid in said passageway to control the temperature of the bearings and to eliminate distortion therebetween.

5. In a machine tool having a lubricant chamber, a passageway substantially surrounding said chamber and adapted to be filled with liquid, and means for controlling the temperature of a portion of the wall defining said passageway to control the temperature of the liquid adjacent thereto and to create a circulation of the liquid in said passageway.

6. In a machine tool having a lubricant chamber, a passageway adapted to be filled with a liquid substantially surrounding said chamber and having a portion of its wall provided with vanes, and means for circulating a fluid over said vanes to change the temperature of the liquid in said passageway adjacent said wall portion to create a circulation of the liquid in said passageway.

7. In a machine tool having a lubricant chamber, a passageway adapted to be filled with a liquid and substantially surrounding said chamber and having a portion of its wall provided with vanes, and means for circulating a liquid over said vanes to change the temperature of the liquid in said passageway adjacent said wall portion to create a circulation of the liquid in said passageway.

8. In a machine tool having a movable part, a bearing for said part, a passageway surrounding said bearing and adapted to be filled with liquid and having a portion of its wall provided with vanes, and means for circulating a fluid over said vanes to control the temperature of said wall portion and the liquid in said passageway adjacent thereto whereby a circulation of the liquid in said passageway will be created.

9. In a machine tool having a movable part, a bearing for said part, a passageway surrounding said bearing adapted to be filled with liquid and having a portion of its wall provided with vanes, and means for circulating a liquid over said vanes to control the temperature of said wall portion and the liquid in said passageway adjacent thereto whereby a circulation of the liquid in said passageway will be created.

10. In a machine tool having a movable part, a bearing for said part, a passageway surrounding said bearing adapted to be filled with liquid and having a portion of its wall provided with vanes, and means for controlling the temperature of said wall portion and vanes to create circulation of the liquid in said passageways.

11. In a machine tool, a movable part, a bearing for said part, a passageway surrounding said bearing adapted to be filled with liquid and having therein a baffle plate, and means for controlling the temperature of said liquid between said plate and a portion of the wall defining said passageway to create a circulation of the liquid in said passageway.

12. In a machine tool, a lubricant chamber, a passageway substantially surrounding said chamber and adapted to be filled with liquid and having therein a baffle plate, and means for controlling the temperature of said liquid between said plate and a portion of the wall defining said passageway to create a circulation of the liquid in said passageway.

13. In a machine tool, a movable part, a bearing for said part, a passageway surrounding said bearing adapted to be filled with liquid and having therein a baffle plate, said passageway having a portion of its wall adjacent said baffle plate provided with vanes, and means for controlling the temperature of said wall portion and vanes to control the temperature of the liquid between said baffle plate and said wall portion to create a circulation of the liquid in said passageway.

14. In a machine tool having a lubricant chamber, a passageway substantially surrounding said chamber and adapted to be filled with liquid, and means for controlling the temperature of a portion of the wall defining said passageway to control the temperature of the liquid adjacent thereto and to create a circulation of the liquid in said passageway comprising vanes and a fan for circulating fluid over said vanes.

15. In a machine tool having a movable part, a bearing for said part, a lubricant chamber, a passageway surrounding said bearing and substantially surrounding said chamber and adapted to be filled with liquid, and means for controlling the temperature of a portion of the wall defining said passageway to control the temperature of the liquid adjacent thereto and to create a circulation of the liquid in said passageway comprising a tubular member provided with vanes and a fan for circulating fluid through said tubular member and over said vanes.

16. In a machine tool having a movable part, bearings for said part, a passageway surrounding said bearings, and means for connecting said passageway to a source of positively circulated liquid to control the temperature of said bearings and to eliminate distortion therebetween.

17. In a machine tool, a lubricant chamber, a passageway substantially surrounding said chamber, and means for connecting said passageway to a source of positively circulated liquid to control the temperature of the lubricant in said chamber and to eliminate distortion in the various parts of the machine.

18. In a machine tool having a movable part, bearings for said part, a passageway surrounding said bearings and adapted to have a positive circulation of liquid therethrough, and means for controlling and regulating the circulation of the liquid through said passageway to control the temperature of said bearings and prevent distortion therebetween.

19. In a machine tool, a lubricant chamber, a passageway substantially surrounding said chamber and adapted to have a liquid positively circulated therethrough, and means for controlling and regulating the circulation of said liquid through said passageway to control the temperature of the lubricant in said chamber and to prevent distortion of the various parts of the machine.

20. In a machine tool, a movable part, bearings for said part, a lubricant chamber, a passageway surrounding said bearings and substantially surrounding said chamber and adapted to have liquid positively circulated therein, and means for connecting said passageway with a source of positively circulated liquid to control the temperature of the lubricant in said chamber and of said bearings and to eliminate distortion between the latter.

21. In a machine tool, a movable part, a bearing for said part, a way arranged in predetermined relationship with said bearing, a passageway surrounding said bearing, and means for circulating liquid through said passageway to control the temperature of said bearing and prevent distortion in the relationship of said bearing and said way.

22. In a machine tool, a movable part having spaced bearings, a passageway surrounding said bearings, a way arranged in parallelism with the axes of said bearings, and means for circulating liquid through said passageway to control the temperature of said bearings and to maintain the axes thereof in parallelism with the way.

23. In a machine tool, a lubricant chamber having spaced bearings associated therewith, a movable part mounted in said bearings, a passageway surrounding said bearings and substantially surrounding said chamber, a way arranged in parallelism with the axes of said bearings, and means for circulating liquid through said passageway to control the temperature of the lubricant in said chamber and the temperature of said bearings and control the relationship between the axes of said bearings and said way.

24. In a machine tool, a spindle, spaced bearings for said spindle, a way arranged in parallelism with the axis of said spindle, a passageway surrounding said bearings, and means for circulating liquid through said passageway to control the temperature of the bearings and prevent distortion between the same and said way.

EDWARD P. BURRELL.